No. 784,747. PATENTED MAR. 14, 1905.
J. M. LOBIT.
FISHING SPEAR.
APPLICATION FILED JULY 6, 1904.

Witnesses:
Raphael Netter
S. S. Dunham

Jean Martial Lobit, Inventor
by Kerr, Page & Cooper Att'ys.

No. 784,747.

Patented March 14, 1905.

UNITED STATES PATENT OFFICE.

JEAN MARTIAL LOBIT, OF NEW YORK, N. Y.

FISHING-SPEAR.

SPECIFICATION forming part of Letters Patent No. 784,747, dated March 14, 1905.

Application filed July 6, 1904. Serial No. 215,538.

*To all whom it may concern:*

Be it known that I, JEAN MARTIAL LOBIT, a citizen of the French Republic, residing at New York, in the county of Kings and State of New York, have invented certain new and useful Improvements in Fishing-Spears, of which the following is a specification, reference being had to the drawings accompanying and forming a part of the same.

My invention relates to devices for spearing fish, frogs, and other small game, more particularly to devices of the kind in which a spring-actuated spear held in retracted position by a suitable trigger is upon release of the trigger projected by the force of the spring into the body of the game. My invention, however, contemplates certain improvements in these devices, and to such ends consists in the novel features, combinations of elements, and arrangements of parts hereinafter described, and more particularly pointed out in the claims.

The invention will be more readily understood when explained in connection with the accompanying drawings, in which—

Figure 1:
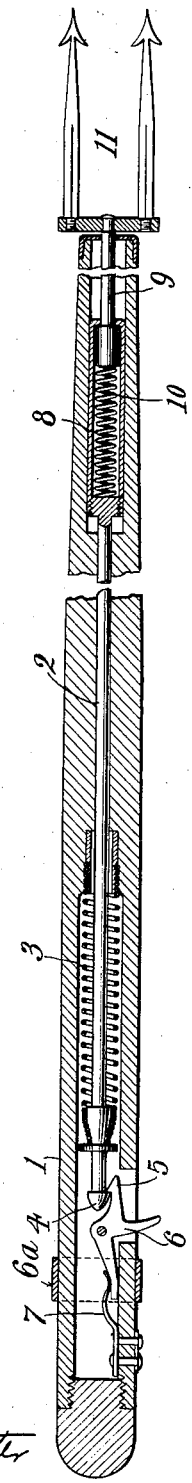
Figure 2:
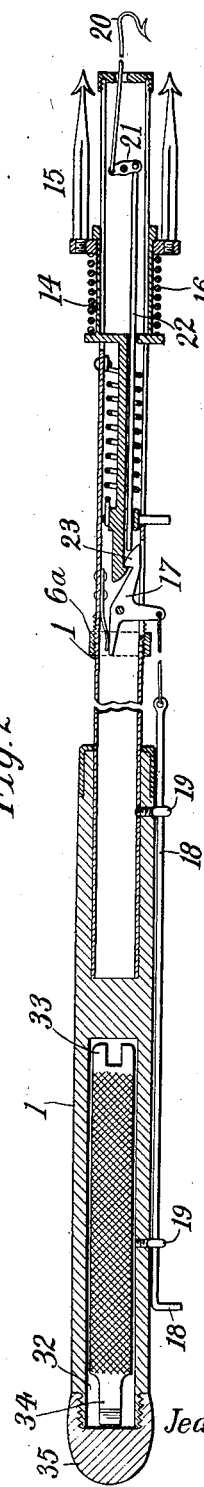
Figure 3:
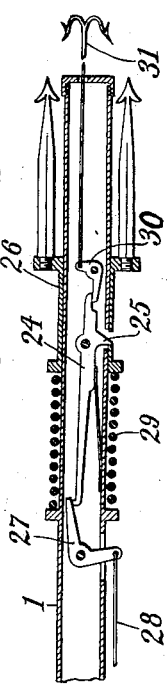
Figure 4:
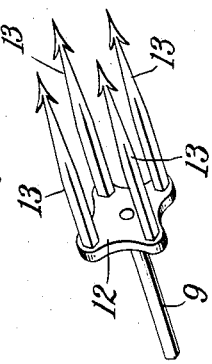

Figure 1 is a longitudinal section of a convenient embodiment of the same. Figs. 2 and 3 are sectional views showing modifications, and Fig. 4 is a detail showing in perspective a spear-head which I prefer to employ.

The handle or holder of the device is indicated by 1. This may be made in one piece of any convenient length or may be jointed in the usual way, like the ordinary fishing-rod, as will be readily understood. This handle or holder is tubular, and in the form shown in Fig. 1 it carries a rod 2, extending substantially the entire length of the handle or holder. In the butt of the latter is a contractible spring 3, connected with the rod 2 and the handle 1 in such a way that the spring will be expanded by retracting the rod 2 into the holder. The rod at this end is provided with a suitable catch or button 4 to be engaged by a hook 5 on the trigger 6, which latter is held in the position to engage the button by a spring 7. At the other end of the rod is a casing 8, in which is carried a sliding stem 9, projecting from the casing and out of the rod or holder 1. The stem is normally held in its outermost position by a suitable spring 10. Carried by the stem 9 is a spear-head 11 of any convenient form. I prefer, however, that shown in Fig. 4, consisting of a transverse plate 12, carrying a plurality of points 13.

From the foregoing the operation of the device will be readily understood. The rod being retracted and caught by the trigger, the device is brought into proximity with the fish or other object to be speared, and careful aim being taken the trigger is released, whereupon the rod 2 is projected with considerable force to the limit of its movement and the spear-head 11 thereby carried into the body of the game. The purpose of the yielding connection between the head 11 and the rod 2 is to prevent unnecessary mangling of the game by the force of the blow and also to lessen damage to the spear-points if they should be inadvertently projected against stones or other hard obstacles.

6ª indicates a ring tightly fitting or screw-threaded to the rod 1, adapted to be moved up against the trigger 6 to prevent release of the latter. The rod can then be used with a line as an ordinary fishing-rod without danger of the spear being released.

Fig. 2 shows a modification of the device, in which the stem 9 is replaced by a sliding sleeve 14, upon which in turn is movably mounted the spear-head 15, with a spring 16 between the two to provide the desired yielding support for the head. In this form of the invention the operative parts of the device are located near the forward end thereof, and for the purpose of releasing the trigger 17 I provide a rod 18, connected with the trigger and extending through eyelets 19 to the butt of the device. By pulling on the rod 18 the trigger 17 will be actuated and the spear released, as will be readily understood. In this form of invention I have also provided means to permit the device to be used in a manner analogous to a trap. Such means consist of a bait-carrier, such as a hook 20, connected with a small lever 21, which in turn is connected with a rod 22. The latter extends backward until it bears against the inclined surface 23 of the trigger-hook. It will now be seen that the game on seizing the bait carried by the hook 20 will advance the rod 22 against the cam-surface 23, thereby depressing the trigger-hook and releasing the spear in the same manner as if the trigger had been manually operated.

A further modification of the device is shown in Fig. 3. Here the trigger consists of a lever 24, having a finger 25 projecting through an opening in the holder 1 to engage the sliding sleeve 26 in an opening which registers with the first when the sleeve is in its retracted position. The rear end of the lever 24 is engaged by a bell-crank lever 27, from which extends a rod or wire 28 back to the butt of the holder 1. Pulling on this rod or wire will lift the finger 25, as will be readily understood, out of engagement with the sleeve 26, and so permit the spear to be projected by the spring 29. The forward end of the lever 24 engages a bell-crank lever 30, with which is connected a hook 31. It will now be seen that, as in the former construction, seizing of the bait by the game will also release the spear, in this case by raising the forward end of the lever 24 and so carrying the finger 25 out of engagement with the spear-sleeve 26.

It sometimes happens that the spear-head or other part of the device is damaged, and it is desirable to have means for repairing the same conveniently at hand. For this purpose the handle or holder 1 may be provided, as in Fig. 2, with a receptacle 32 in the butt thereof, in which may be carried a combination tool or file having at one end a wrench 33, with which the points of the spear may be removed, adjusted, or inserted, and at the other end a screw-driver 34. Of course other tools or devices may be carried in the receptacle, if desired. A removable closure, as the screw-cap 35, holds the contents of the receptacle in place.

The forms herein described I consider convenient embodiments of my invention; but the same may of course be varied still further without departure from the proper scope of the invention.

What I claim is—

1. In a device of the kind described, the combination of a handle or holder, a spring-actuated spear-rod carried by the handle or holder, a trigger for holding the rod in retracted position against the tension of the spring, and a spear-head yieldingly carried by the spear-rod, as set forth.

2. In a device of the kind described, the combination of a handle or holder, a spring-actuated spear-rod carried by the handle or holder, a spear-head carried by the spear-rod, a trigger for holding the rod in retracted position against the tension of the spring, and a bait-carrier arranged to release the trigger, as set forth.

3. In a device of the kind described, the combination of a handle or holder, a spring-actuated spear-rod carried by the handle or holder, a trigger for holding the rod in retracted position against the tension of the spring, a spear-head yieldingly carried by the spear-rod, and a bait-carrier arranged to release the trigger, as set forth.

4. In a device of the kind described, the combination of a handle or holder, a spring-actuated spear-rod carried by the handle or holder, a manually operated trigger for holding the rod in retracted position against the tension of the spring, a spear-head yieldingly carried by the spear-rod, and a bait-carrier arranged to release the trigger, as set forth.

JEAN MARTIAL LOBIT.

Witnesses:
S. S. Dunham,
M. Lawson Dyer.